(12) United States Patent
Muller et al.

(10) Patent No.: US 6,640,881 B2
(45) Date of Patent: Nov. 4, 2003

(54) HOLDING ASSEMBLY FOR THE ATTACHMENT OF AN EXHAUST GAS HEAT EXCHANGER

(75) Inventors: Daniel Muller, Stuttgart (DE); Andreas Reschke, Markgroningen (DE); Jurgen Rosin, Stuttgart (DE)

(73) Assignee: BEHR GmbH & Co., Stuttgart (DE)

( * ) Notice: Subject to any disclaimer, the term of this patent is extended or adjusted under 35 U.S.C. 154(b) by 0 days.

(21) Appl. No.: 10/252,627

(22) Filed: Sep. 23, 2002

(65) Prior Publication Data

US 2003/0056937 A1 Mar. 27, 2003

(30) Foreign Application Priority Data

Sep. 26, 2001 (DE) .......................................... 101 47 555

(51) Int. Cl.[7] .................................................. F28F 9/00
(52) U.S. Cl. .......................... 165/67; 165/76; 180/68.4
(58) Field of Search ........................... 165/67, 76, 906; 180/68.4

(56) References Cited

U.S. PATENT DOCUMENTS

| | | | |
|---|---|---|---|
| 1,882,555 A | 10/1932 | Gray | |
| 2,415,154 A * | 2/1947 | Walter | 165/67 |
| 2,912,198 A | 11/1959 | Feil, Jr. | |
| 3,014,681 A | 12/1961 | Feil, Jr. | |
| 4,230,176 A * | 10/1980 | Crews | 165/67 |
| 4,436,145 A * | 3/1984 | Manfredo et al. | 165/67 |
| 5,000,257 A * | 3/1991 | Shinmura | 180/68.4 |
| 5,407,161 A * | 4/1995 | Mulkeran | 165/67 |
| 6,123,143 A * | 9/2000 | Insalaco | 165/67 |
| 6,332,495 B1 * | 12/2001 | Jamison et al. | 165/67 |

FOREIGN PATENT DOCUMENTS

| | | |
|---|---|---|
| DE | 17 29 526 | 9/1956 |
| DE | 196 21 271 A1 | 1/1997 |
| DE | 198 15 705 A1 | 10/1999 |
| DE | 198 36 889 A1 | 2/2000 |
| DE | 198 36 889 A1 | 2/2002 |
| GB | 20 34 261 A | 6/1980 |
| GB | 22 12 771 A | 8/1989 |
| JP | 404288488 A * | 10/1992 .................. 165/67 |

* cited by examiner

Primary Examiner—Terrell McKinnon
(74) Attorney, Agent, or Firm—Leydig, Voit & Mayer Ltd.

(57) ABSTRACT

A holding assembly for fastening an exhaust gas heat exchanger to a structural component, with a circumferential bracket which encloses the exhaust gas heat exchanger between its ends, which holding assembly presents at least one attachment bracket for fastening the holder to the structural component.

20 Claims, 3 Drawing Sheets

HOLDING ASSEMBLY FOR THE ATTACHMENT OF AN EXHAUST GAS HEAT EXCHANGER

This application claims the benefit of copending German patent application DE 101 47 555.1, filed Sep. 26, 2001.

FIELD OF THE INVENTION

The present invention relates to a holding assembly for attaching an exhaust gas heat exchanger to a structural component.

BACKGROUND OF THE INVENTION

From DE 198 36 889 A1 it is known to directly solder two brackets to an exhaust gas heat exchanger, where each bracket is fabricated of bent sheet metal. It is also possible to weld such brackets to the exhaust gas heat exchanger. With the aid of these brackets, the exhaust gas heat exchanger can be attached to a structural component, for example, a car body, by means of a screw connection. However, it has been shown that the soldering or welding under the conditions of use of the exhaust gas heat exchanger promotes the formation of cracks in the body of the exhaust gas heat exchanger, and, as a result, the attachment so formed does not present a sufficient ability to support a permanent load.

The present invention provides a holding assembly for an exhaust gas heat exchanger, which has an increased ability to support a permanent load. These and other advantages of the present invention, as well as additional inventive features, will be apparent from the description of the invention provided herein.

SUMMARY OF THE INVENTION

The invention provides a holding assembly, by means of which an exhaust gas heat exchanger can be attached to a structural component, in such a manner that the holding assembly surrounds the exhaust gas heat exchanger between its ends with positive lock. As a result of this design, the weld connections or soldering connections for fixing a holding assembly to an exhaust gas heat exchanger can be omitted. Weakening of material and fatigue strength effects, which can occur during the application of soldering connections or welding connections, are eliminated in this construction design, resulting in improved durability of the holding assembly disclosed herein.

In one embodiment, the location of the holding assembly, or the section of the holding assembly, which surrounds the exhaust gas heat exchanger, can be regulated or adjusted in the longitudinal direction of the exhaust gas heat exchanger, relative to the latter, during assembly. This allows compensation for positioning tolerances during the attachment of the exhaust gas heat exchanger. In this manner it is also possible to simplify the assembly process. At the same time, the formation of stresses is reduced by the compensation for positional tolerances, which has an advantageous effect on the ability of the holding assembly of the present invention to support permanent loads.

Another embodiment, which is of particular importance, relates to a holding assembly, which is designed in such a manner that it surrounds an exhaust gas heat exchanger with a self-holding clamp seat. According to this embodiment, in the assembled state, relative motion between the holding assembly and the exhaust gas heat exchanger can be suppressed. As a result, secure and reliable positioning of the exhaust gas heat exchanger on the given structural component is achieved.

According to another advantageous embodiment, the holding assembly may consist of two receiving sections, each of which may surround a circumferential section of the exhaust gas heat exchanger, and at least one attachment bracket. The receiving sections may surround the exhaust gas heat exchanger when the receiving sections are combined. Moreover, when the receiving sections are combined to surround the heat exchanger, the attachment brackets may overlap one other in such a manner that they can be attached jointly to the structural component. This design simplifies the process of fastening the exhaust gas heat exchanger to a given structural component, because the holding assembly may be directly fitted to the exhaust gas heat exchanger as the heat exchanger is being fitted to the structural component. As a result, it is also possible to fit the exhaust gas heat exchanger to a train of exhaust gas pipes before fitting the holding assembly. As a result, the holding assembly, which may take up a large amount of space, does not interfere with the assembly process. Rather, the absence of the holding assembly at this stage may simplify the assembly process. The two-part holding assembly according to the invention may then be installed after the heat exchanger is fitted. Since the attachment brackets associated with the individual receiving sections may be attached jointly to the structural component, the assembly of the holding assembly is simplified here as well.

According to another embodiment, each receiving section may include connection brackets that are joined when the holding assembly is assembled. As a result, the holding assembly may be better adapted to the given installation conditions. The connection brackets may be shaped, for example, in such a manner that two complementary parts formed on respective connection brackets may engage each other with positive lock upon assembly. It is also possible to screw, bolt, weld or solder the two receiving sections together in the area of their connection brackets.

According to another advantageous embodiment, at least one of the receiving sections may include preformed contact areas such as ribs or bosses in the receiving section, which extend toward the exhaust gas heat exchanger. These ribs or bosses may contact the exhaust gas heat exchanger during assembly if the holding assembly has the appropriate dimensions. Additionally, the ribs or bosses may apply point-shaped or line-shaped retention forces onto the exhaust gas heat exchanger, thus contributing to a more secure and reliable positioning of the exhaust gas heat exchanger with respect to the given structural component.

The fastening of the holding assembly to a structural component may be simplified by attachment brackets disposed on one side of the holding assembly, which are U-shaped, and all open in the same direction. As a result, it may be possible to fasten the laterally open holding brackets simultaneously to screws premounted on the structural component. The U-shaped attachment brackets may also afford compensation for positioning tolerances.

Other objects and advantages of the invention will become apparent upon reading the following detailed description and upon reference to the accompanying drawings, in which like numerals represent like elements in the several figures.

DETAILED DESCRIPTION OF THE INVENTION

Figure 1:
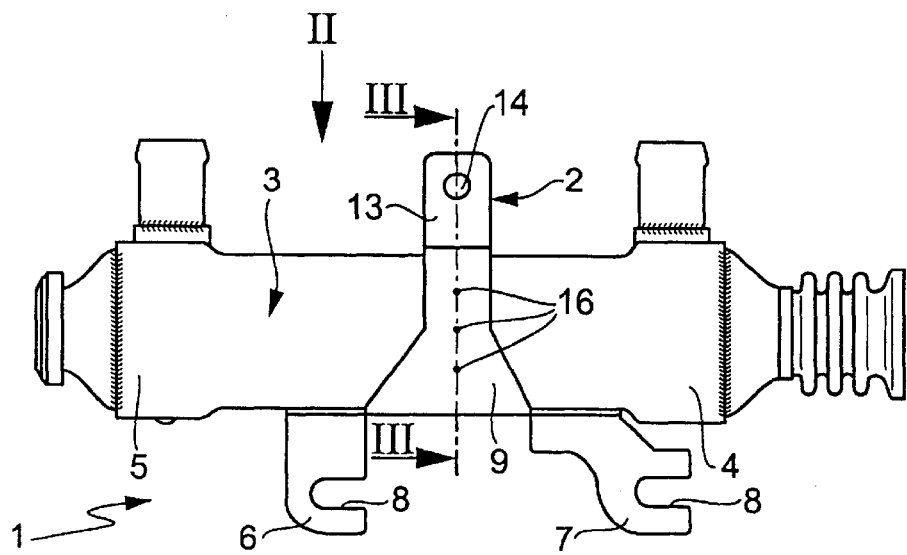
FIG. 1 shows a top view of an exhaust gas heat exchanger with a holding assembly according to the invention.
Figure 2:
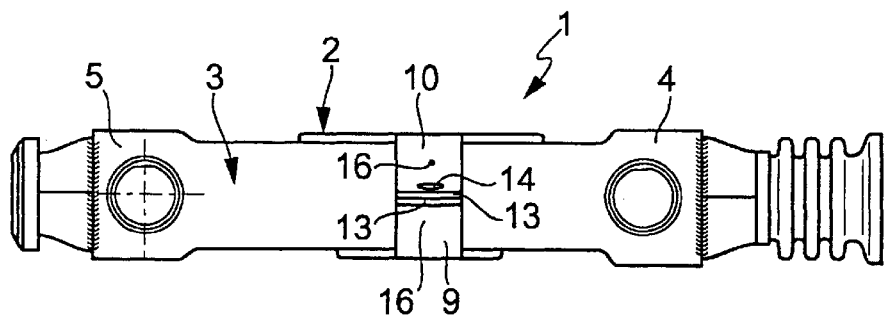
FIG. 2 shows a side view along the arrow II in FIG. 1 of the exhaust gas heat exchanger equipped with the holding assembly according to the invention.
Figure 3:
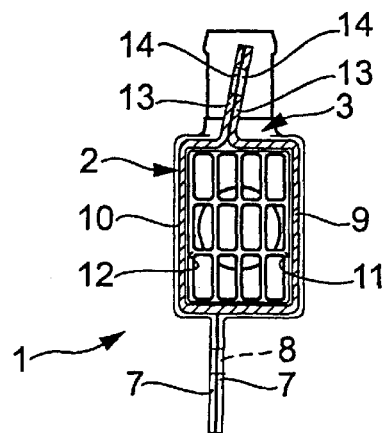
FIG. 3 shows a cross section through the holding assembly according to the invention corresponding to cross section line III—III in FIG. 1.

According to FIGS. 1–3, an attachment device 1 according to the invention includes a holding assembly 2 which may include a circumferential bracket that may completely surround a circumferential section of an exhaust gas heat exchanger 3 between two ends 4, 5 of the heat exchanger 3. The holding assembly 2 may include, on one side of the exhaust gas heat exchanger 3, two attachment brackets 6, 7, whereby the holding assembly 2 may be fastened to an appropriate structural component, not shown. For example, the holding assembly 2 may be screwed with its attachment brackets 6, 7 to the body of a car. The attachment brackets 6, 7 may be fitted with U-shaped forks 8, where the forks 8 of the two attachment brackets 6, 7 open in the same direction. In this manner, the holding assembly 2 may be easily attached to screws premounted or preinserted into the structural component by simply sliding the holding assembly 2 longitudinally, in the direction of the open ends of the U-shaped forks 8.

According to an embodiment of the invention, the holding assembly 2 may include two receiving sections, namely a first receiving section 9 and a second receiving section 10. As shown particularly in FIG. 3, these two receiving sections 9, 10 are nearly complementary in their shapes, so that the two receiving sections 9, 10 may combine to surround a circumferential section of the exhaust gas heat exchanger 3, in such a manner that the two receiving sections 9, 10, which may include receiving surfaces 11, 12, enclose the exhaust gas heat exchanger 3 in the combined holding assembly 2. The internal contour of each receiving section 9, 10, may be adapted to the external contour of the associated circumferential section of the exhaust gas heat exchanger 3. Here, each receiving section 9, 10 may include two attachment brackets 6, 7, which are shaped and arranged in such a manner that, in the assembled holding assembly 2, their positions may substantially overlap, so that the two attachment brackets 6 or 7, may be jointly attached to the given structural component, as if they were a single attachment bracket. Accordingly, this design provides for simplified assembly.

On the opposite side of the exhaust gas heat exchanger 3 from the attachment brackets 6, 7, each receiving section 9, 10 may include a connection bracket 13, whereby the two receiving sections 9, 10, in the assembled holding assembly 2, may be connected to each other. For example, the two connection brackets 13 may include an opening 14, through which a connection screw or bolt may be inserted and secured by a nut. To the extent possible under the installation conditions, it may also be possible to use the connection brackets 13 as additional attachment brackets, and to connect, at this place as well, the holding assembly 2 to the given structural component. In this case, attachment and connection brackets 6, 7, 13 are provided on two opposite sides of the exhaust gas heat exchanger 3, whereby the holding assembly 2 or the receiving sections 9, 10 may be fastened to the given structural component.

Figure 6:
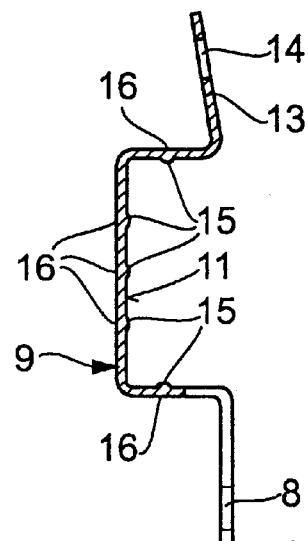
FIG. 6 is a cross-sectional view of the receiving section of FIG. 5 corresponding to cross section line IV—IV in FIG. 4.
Figure 5:
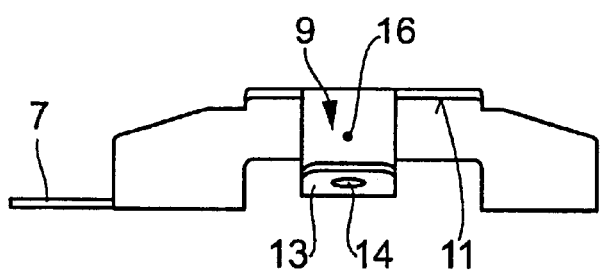
FIG. 5 shows a side view of the receiving section of the present invention illustrated in FIG. 4.
Figure 7:
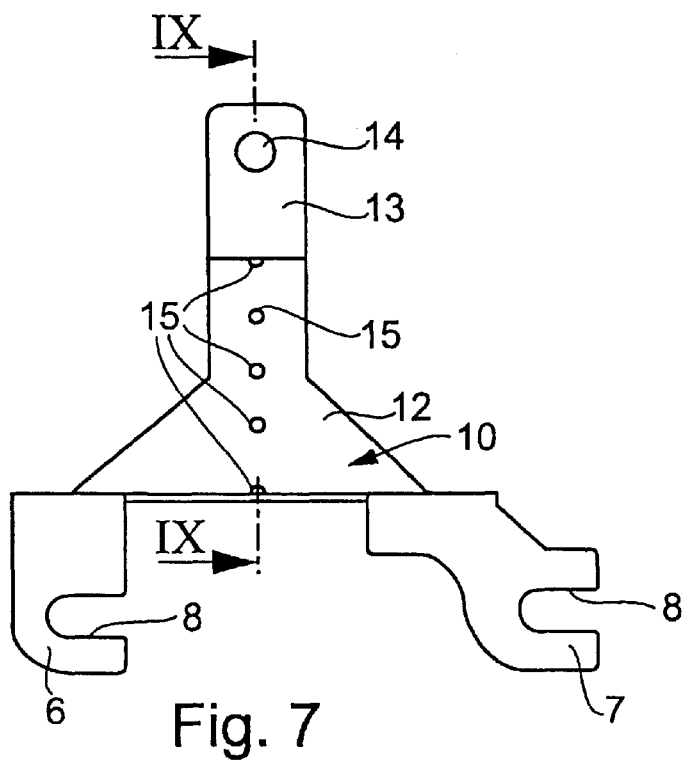
FIG. 7 is a top view of a receiving section of the holding assembly according to the invention.
Figure 9:
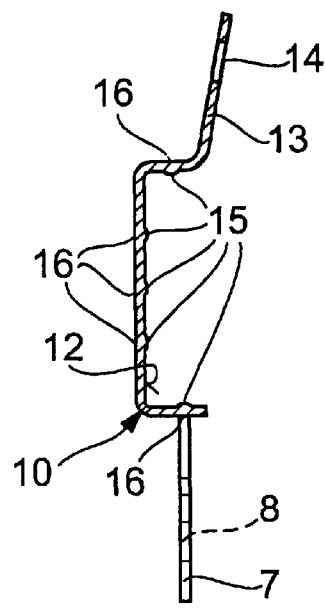
FIG. 9 is a cross-sectional view of the receiving section of FIG. 7, corresponding to the cross-sectional line IX—IX in FIG. 7.
Figure 8:
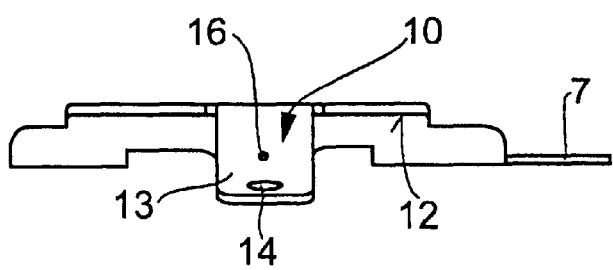
FIG. 8 is a side view of the receiving section of FIG. 7.

To adapt the holding assembly 2 to the given installation conditions, it may also be possible, for example, to bend the connection brackets 13 at an angle with respect to the attachment brackets 6, 7, as is apparent, for example, in the cross-sectional views of FIGS. 6 and 9. It is apparent from FIGS. 1 and 2, that, in the assembly of the holding assembly 2, it is in principle possible, to adjust it, prior to a definitive fixation, in the longitudinal direction of the exhaust gas heat exchanger 3. In this manner, for example, the attachment brackets 6, 7 and optionally connection brackets 13 may be oriented relative to threaded rods or threaded openings on or in the structural component to which the holding assembly 2 is to be attached.

Figure 4:
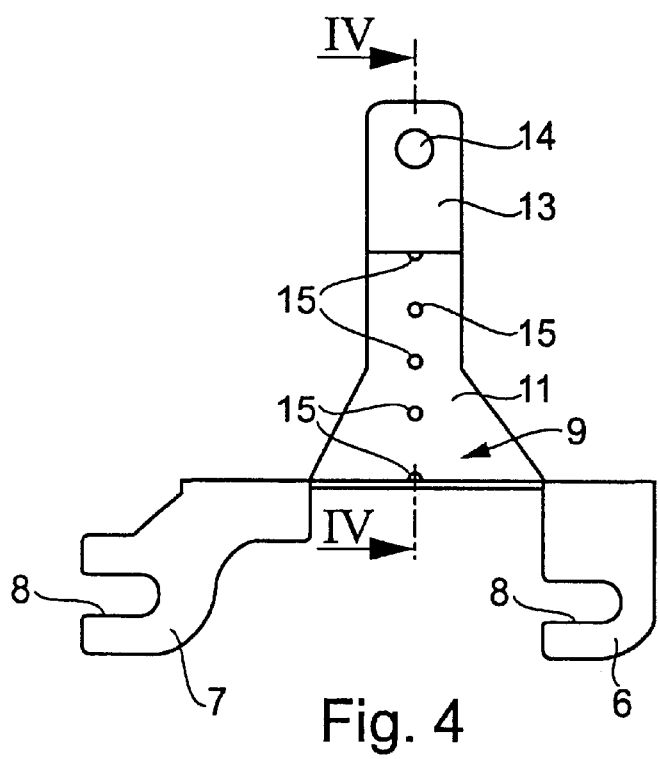
FIG. 4 shows a top view of a receiving section of the holding assembly according to the invention.

According to another embodiment, the holding assembly 2 may grip the exhaust gas heat exchanger 3, in the assembled state, with a self-holding clamp seat. The relative position between holding assembly 2 and exhaust gas heat exchanger 3 is then fixed. To improve or to generate the desired clamp effect, bosses 15 may be formed in the receiving sections 9, 10, which bosses project in the direction of the exhaust gas heat exchanger 3 from the receiving sections 9, 10. These bosses 15 can be seen particularly clearly in FIGS. 4 and 6 as well as 7 and 9. These bosses 15, when the receiving sections 11, 12 have the proper dimensions, and when the holding assembly 2 is assembled, may form point-shaped force contact sites, which guarantee an effective clamp effect and thus an effective fixing of the holding assembly 2 to the exhaust gas heat exchanger 3. The bosses 15 may be prepared, for example, by forming, at the corresponding sites on the external side of each receiving section 9, 10, which side is turned away from the exhaust gas heat exchanger 3, corresponding recesses 16, in particular by punching. In addition, or alternatively, to such bosses 15, projecting ribs can also be provided to improve or achieve the clamp effect.

The receiving sections 9 and 10 can be manufactured in a particularly cost effective and simple manner by reshaping, beveling, or stamping sheet metal. Correspondingly, the holding assembly 2 according to the invention can be manufactured in a particularly cost effective manner.

Since the holding assembly 2, in the mounted state, completely surrounds the exhaust gas heat exchanger 3 with positive lock, the latter is attached to the given structural component, at least in a manner which minimizes failure of the corresponding components. Moreover, provided that a self-holding clamp seat is implemented between the holding assembly 2 and the exhaust gas heat exchanger 3, it is also possible to obtain, with high reliability, a predetermined relative position between the exhaust gas heat exchanger 3 and the given structural component. In this context, it is particularly important that the holding assembly 2 according to the invention does not require a welding connection or a soldering connection between the holding assembly 2 and the exhaust gas heat exchanger 3. Weakening of the material of the exhaust gas heat exchanger 3, which can result from such welding or soldering connection, is prevented as a result, and the life span of the exhaust gas heat exchanger 3 of the connection of the exhaust gas heat exchanger 3 or the given structural component is increased.

All of the references cited herein, including patents, patent applications and publications, are hereby incorporated in their entireties by reference.

While this invention has been described with an emphasis upon preferred embodiments, variations of the preferred embodiments may be used, and it is intended that the invention can be practiced otherwise than as specifically described herein. Accordingly, this invention includes all modifications encompassed within the spirit and scope of the invention as described by the following claims.

What is claimed is:

1. A holding assembly for attaching an exhaust gas heat exchanger to a structural component comprising:

first and second receiving sections which combine to at least partially enclose a portion of the heat exchanger, and wherein at least one receiving section includes an attachment bracket capable of being fastened to the structural component;

a U-shaped attachment bracket connected to each receiving section and oriented in the same direction as at least one other attachment bracket;

a connection bracket that extends from each receiving section and is capable of connecting the receiving sections together; and a preformed contact area located on each receiving section whereby the receiving sections combine to grip the exhaust gas heat exchanger upon fastening of the holding assembly to the structural component.

2. The holding assembly of claim 1 wherein the preformed contact areas include at least one boss.

3. The holding assembly of claim 1 wherein the preformed contact areas include at least one rib.

4. The holding assembly of claim 1 wherein one of the receiving sections includes a contact area comprising at least one boss and the other receiving section includes a contact section comprising at least one rib.

5. The holding assembly of claim 1 wherein each receiving section includes an attachment bracket that is U-shaped, and wherein all U-shaped attachment brackets are oriented in the same direction.

6. The attachment device according to claim 1 wherein the attachment brackets are on the opposite side of the holding assembly from the connection brackets, and wherein the connection brackets are capable of being bolted together.

7. A holding assembly for attaching an exhaust gas heat exchanger to a structural component comprising:

a circumferential bracket that at least partially encloses the heat exchanger, the bracket disposed between two ends of the heat exchanger, and an attachment bracket connected to the circumferential bracket, wherein the attachment bracket is capable of fastening the holding assembly and exhaust gas heat exchanger to the structural component.

8. The holding assembly of claim 7 further including a clamp seat with at least one preformed contact area wherein the clamp seat grips the exhaust gas heat exchanger upon connection of the holding assembly to the heat exchanger.

9. The holding assembly of claim 8 wherein the preformed contact area includes at least one boss.

10. The holding assembly of claim 8 wherein the preformed contact area includes at least one rib.

11. The holding assembly of claim 8 wherein the clamp seat includes at least two preformed contact areas, one of which comprises at least one boss and the other of which comprises at least one rib.

12. A holding assembly for attaching an exhaust gas heat exchanger to a structural component comprising first and second receiving sections which combine to enclose at least a portion of the heat exchanger between two ends of the heat exchanger, and wherein at least one receiving section includes an attachment bracket capable of being fastened to the structural component.

13. The holding assembly of claim 12 wherein each receiving section includes an attachment bracket that is U-shaped and oriented in the same direction as at least one other U-shaped attachment bracket.

14. The holding assembly of claim 12 further including connection brackets that extend from each receiving section and are capable of connecting the receiving sections together.

15. The holding assembly of claim 14 wherein the connection brackets of the respective receiving sections are capable of being bolted together.

16. The holding assembly of claim 14 wherein the connection brackets are disposed on the opposite side of the holding assembly from the attachment brackets.

17. The holding assembly of claim 12 wherein at least one of the receiving sections includes a preformed contact area whereby the receiving sections combine to grip the exhaust gas heat exchanger upon fastening of the holding assembly to the structural component.

18. The holding assembly of claim 17 wherein the preformed contact area comprises a boss.

19. The holding assembly of claim 17 wherein the preformed contact area comprises a rib.

20. The holding assembly of claim 12 wherein each receiving section includes at least one preformed contact area whereby the receiving sections combine to grip the exhaust gas heat exchanger upon fastening of the holding assembly to the structural component, and wherein the preformed contact areas comprise at least one boss and at least one rib.

* * * * *